United States Patent
De Baun

[15] 3,707,046
[45] Dec. 26, 1972

[54] UNIVERSAL FILTER HOLDING FRAME AND MEDIA ASSEMBLY

[72] Inventor: Kenneth W. De Baun, Novato, Calif.

[73] Assignee: Servodyne Corporation

[22] Filed: Feb. 16, 1971

[21] Appl. No.: 115,522

[52] U.S. Cl. .................55/483, 55/484, 55/496, 55/502, 55/509, 55/511
[51] Int. Cl. .................................................B01d 46/40
[58] Field of Search...............55/490, 499, 494–497, 55/502, 504, 483–484, 511, 499, DIG. 31; 98/40 D

[56] References Cited

UNITED STATES PATENTS 2,252,724 8/1941 Myers..................................55/483 X
3,430,771 3/1969 Dreher................................55/484 X
3,553,942 1/1971 Harrington.............................55/483

Primary Examiner—Tim R. Miles
Assistant Examiner—Vincent Gifford
Attorney—Eckhoff and Hoppe

[57] ABSTRACT

A universal open-ended filter holding frame structure is assembled from specially shaped support components which are snapped together or to similarly shaped peripheral seals or slides at duct or plenum chamber walls by semi-rigid channels that provide positive air seals between the assembled components. Interference type locking clips releasably hold filter media units in the holding frame structure.

8 Claims, 6 Drawing Figures

PATENTED DEC 26 1972
3,707,046
SHEET 1 OF 2
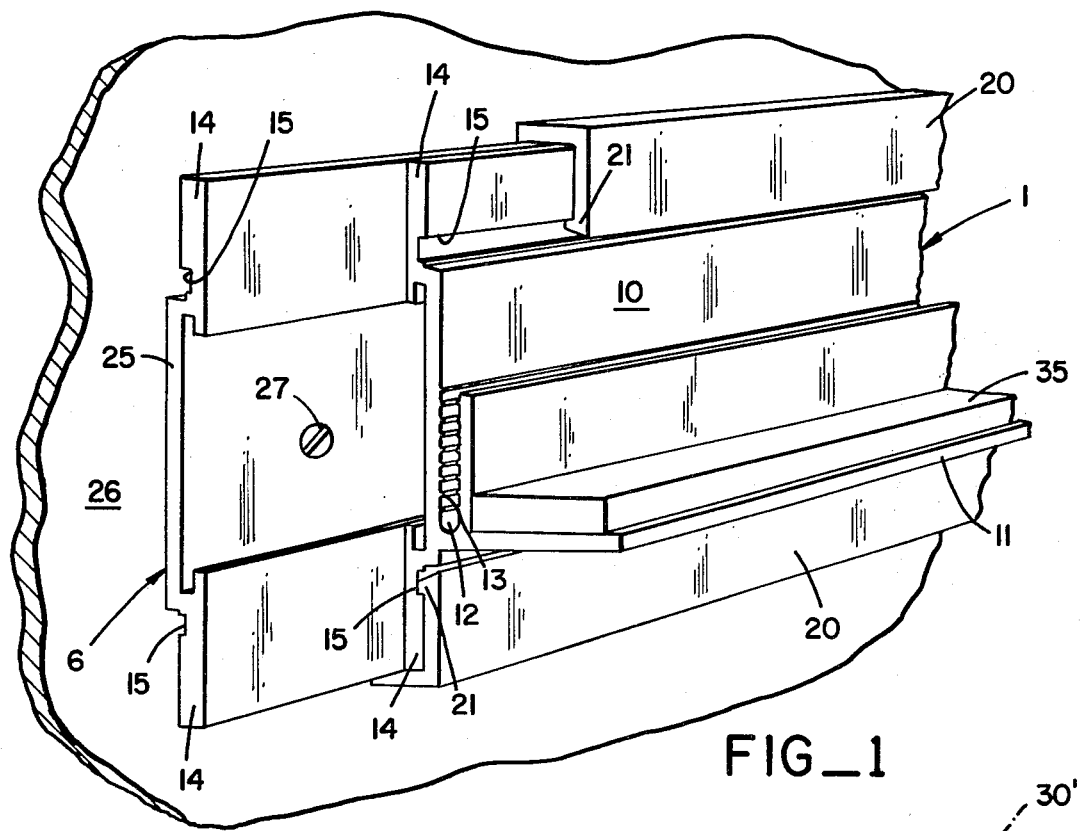
FIG_1
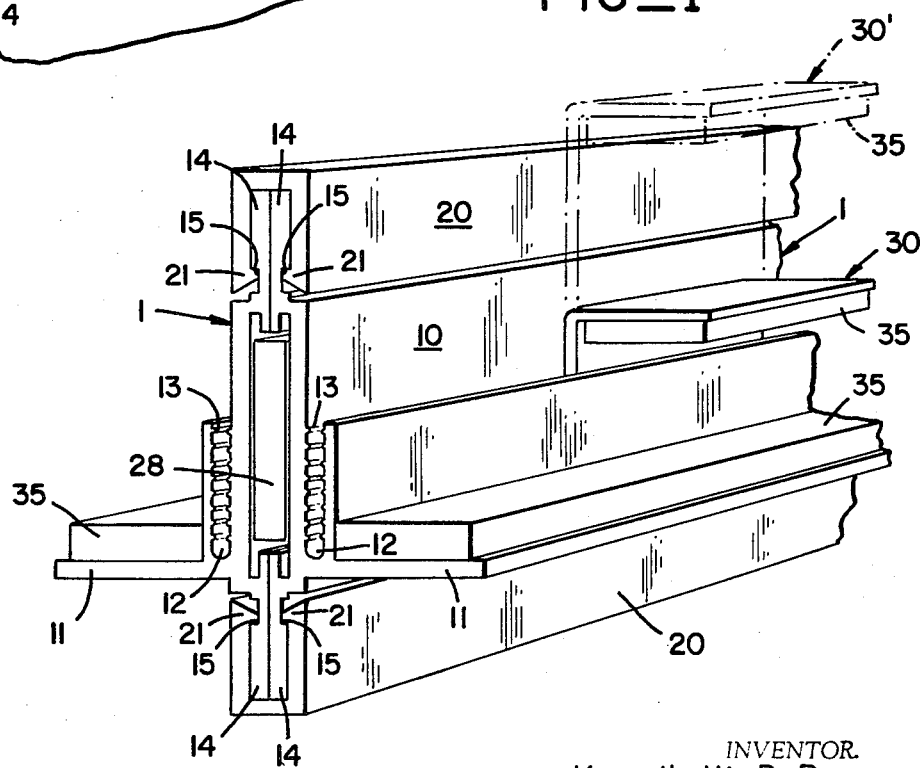
FIG_2
INVENTOR.
Kenneth W. DeBaun
BY
ATTORNEYS

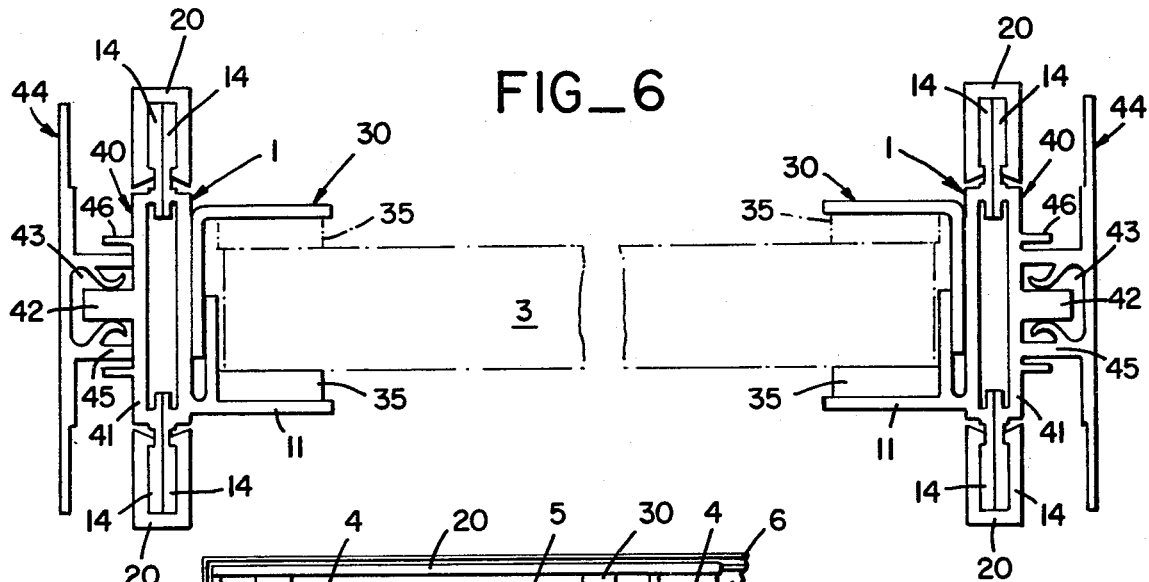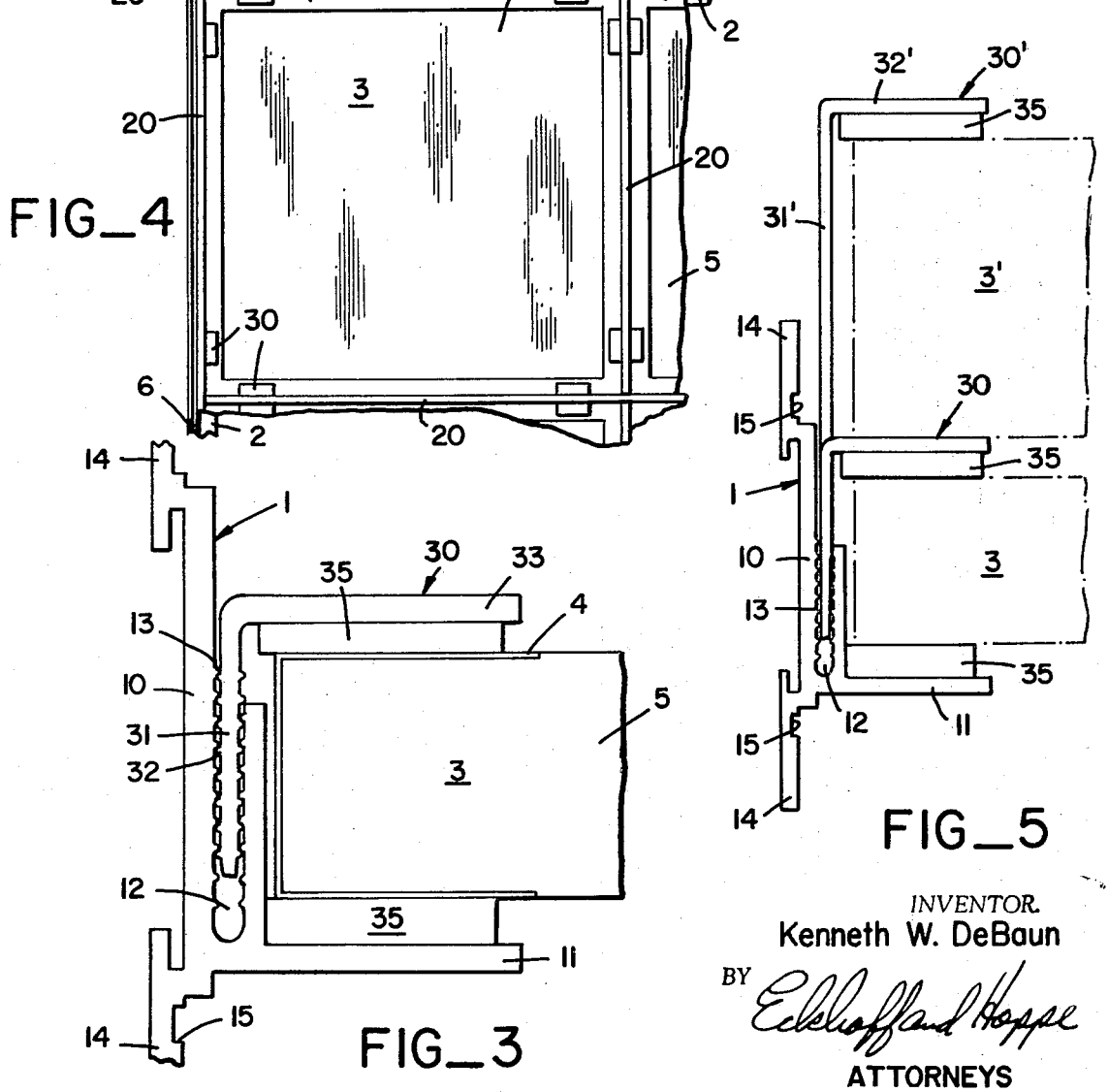

UNIVERSAL FILTER HOLDING FRAME AND MEDIA ASSEMBLY

This invention relates generally to open-ended air or gas filter structures and more particularly to an assembly of universally shaped elements for assembling a variety of filter bank frames and for releasably securing filter media units in them.

One object of this invention is to provide universal filter holding frame structures which employ an assembly of specially shaped components to accommodate any make and type of filter media unit or filter bank configuration.

Another object of this invention is to provide universal holding frame components that snap together into a filter bank assembly without nuts, bolts, rivets or other fastening means.

An object of the invention is to provide a quickly assembled filter bank structure with positive air seals between holding frames or between holding frames and duct or plenum chamber walls without calking or gasketing.

Still another object of the invention is to provide interference type filter locking clips to hold single or multiple stages of filter media in the filter bank structures.

Other objects and advantages of the invention will be apparent from a consideration of the following description of specific embodiments and the accompanying drawings wherein FIG. 1 is a partial perspective view of the components of the assembly for sealing a filter bank against a plenum chamber or duct wall;

FIG. 2 is a partial perspective view of the components of the assembly for joining adjacent filter holding frames;

FIG. 3 is a partial cross-sectional view of one filter holding frame illustrating the cooperation of the locking clips and the holding frames of the assembly;

FIG. 4 is a front elevational view of a portion of a filter bank using the universal holding frame assembly of this invention;

FIG. 5 is a cross-sectional view illustrating the locking clips for securing multiple filter media units to a holding frame of the assembly; and FIG. 6 is a cross-sectional view of the assembly for slidable mounting on the duct walls.

The filter holding frame structure of this invention includes specially shaped components that can be easily assembled into a composite filter bank assembly of any desired configuration such as flat, V-bank, slide-bank, 90° bank, etc. and accommodate a variety of filter media units such as panel, extended area or cartridge types. The invention is illustrated herein with panel type units. The structural components typically are extruded aluminum although other materials can be used for extreme service requirements.

The principal component of the assembly is the holding frame element referred to generally as 1, four of which assemble into a holding frame 2 as shown in FIG. 4, for mounting a typical rectangular open-ended panel type filter media unit 3. The typical unit comprises a rigid or semi-rigid peripheral border 4 that supports filter media 5 through which the air or gas passes for filtration. The filter holding frame elements 1 either can be secured to a perimeter seal 6 as is shown in FIG. 1 or a corresponding holding frame element of an adjacent holding frame as shown in FIG. 2.

Each holding frame element 1 has a central panel 10, an inwardly-turned seating ledge 11 normal to the central panel against which the filter media units are seated, and a locking groove 12 near the seating ledge 11 that carries on its faces a plurality of spaced locking ribs 13. Integral with the central panel 10, seating ledge 11 and locking groove 12 are a pair of locking flanges 14, one on either side of the seating ledge. The inner edge of each locking flange 14 terminates in a bead seat 15.

Adjacent holding frames are secured together in an air-tight or gas-tight seal by a generally C-shaped locking channel 20 made from semi-rigid plastic which snaps around a pair of adjacent locking flanges 14 on adjacent holding frames, for example as in FIG. 2, or on a holding frame 1 and perimeter seal 6 as shown in FIG. 1. The locking channels at the extremities of their two legs carry a bead 21 which when the channel is in place bear against the bead seats 15 adjacent the locking flanges 14 and restrict removal of the locking channels 20 from the abutting flanges 14. The locking channels 20, being semi-rigid and made from plastic material such as polyethylene, for example, easily snap on over the locking flanges 14 and securely lock the assembly components together. They may be removed by springing the beads 21 from engagement with the bead seats 15. The locking channels 20 also provide a very effective gas-tight seal for the adjacent components, both by virtue of securely locking the flanges 14 together and of the labyrinth of right-angle turns and close tolerances which they present to leakage that might occur between the flange faces.

The pair of locking channels 20 in FIG. 1 secures a typical filter holding frame element 1 to a perimeter seal 6. The perimeter seal 6 has a sealing face 25 which corresponds to the central panel 10 of the holding frame element 1. This sealing face fixedly mounts with substantially an air-tight seal to the duct or plenum chamber 26 by screws 27 or other attachment means. Each perimeter seal 6 has a pair of offset locking flanges 14 that correspond to the locking flanges 14 of the holding frame elements 1 and have similar bead grooves 15 as is hereinabove described. Precisely the same locking channels 20 also lock together adjacent holding frame elements 1 as is shown in FIG. 2. Because the locking flanges on the holding frame elements are offset from the center panel 10 a pair of them held together as shown in FIG. 2 provide a cavity between their center panels for stiffening members for the frame assembly such as the rigid bar 28 shown in FIG. 2.

As is most clearly illustrated in FIGS. 2, 3 and 5, the filter media units 3 comprising border 4 and interior filter media 5 are secured against the seating ledges 11 which extend inwardly from the open-ended holding frame by locking clips 30. Each locking clip 30 is generally angular in shape with a first leg 31 carrying a plurality of locking ribs 32 and a second leg 33 which normally extends inwardly substantially parallel to seating ledges 11.

At least one and preferably a plurality of locking clips 30 secure each filter media unit against the holding frame seating ledges. This is done by manually pressing each locking clip axially along the first leg of each to press its locking ribs 32 into locking engagement with the locking ribs 13 of the locking groove 12. Interference between the ribs by force exerted by the filter media unit against the second leg 33 prevents the locking clips normally from pulling out of the locking grooves. However, manual pressure exerted against the second leg 33 at a point remote from its juncture with its first leg 31 of the locking clip releases the interfering engagement of the locking ribs 13, 32 and permits easy removal of the clip and hence, the filter media unit for replacement or maintenance.

A plurality of filter media units may be stacked as shown in FIG. 5 for greater media depth or variable filtering qualities by a second set of clips 30' with first and second legs 31' and 32', respectively, for the overlying filter unit 3', for example. Gaskets 35 on the seating ledges and along the second leg 33 of the several locking clips 30 may be provided for a more effective seal and as an aid to the locking interference of the clip ribs in the locking grooves.

FIG. 6 illustrates a modified construction for a slide-bank filter assembly. It includes the same panel type filter unit 3 locked against the seating ledges 11 of holding frame elements 1 by locking clips 30. In this instance, however, the locking channels 20 secure the locking flanges 14 of the frame elements to corresponding locking flanges 14 of extruded slides 40 having central panels 41 integral with their locking flanges 14 and central slides 42. The slides seat in resilient tracks 43 formed on modified peripheral seals 44. Baffles 45, 46 along with the resilient action between slides and tracks, themselves, assist in restricting straight-through leakage past the slide components.

The illustrated embodiments of the invention provide universal components which are easily assembled into filter banks which can accommodate a variety of commercial filter media units and frame configurations. The components are assembled essentially without fastening means other than the locking clips and locking channels, both of which also provide restrictive gas or air seals between the components which they join.

The described embodiments are for illustrative purposes only. The invention is defined in the appended claims.

I claim:

1. An improved gas filter structure mountable within a duct, plenum chamber or the like comprising
   at least two adjacent open-ended filter units each having a peripheral border and filter media disposed therewithin;
   a separate open-ended rigid holding frame disposed around the periphery of each of said filter units and having an integral locking flange, an inwardly-turned seating ledge, and a ribbed locking groove near the seating ledge, the locking flanges of the holding frames for adjacent filter units abutting one another at least along one side of said units;
   a semi-rigid locking channel resiliently embracing the aforesaid abutting locking flanges of adjacent holding frames to seal them together; and
   a plurality of angular locking clips securing the filter units in their respective frames, each having a first leg ribbed for locking interference with the corresponding locking groove and a second leg inwardly-turned and normally substantially parallel to said seating ledge to hold the border of one of said filter units against the seating ledge when the first leg is pressed into engagement with said locking groove.

2. The improved filter structure of claim 1 wherein the ribs on the first leg of said locking clip move into locking interference with the ribs of said locking groove by pressure applied substantially axially along the first leg and disengage from locking interference with the ribs of said locking groove by pressure applied to the second leg remote from its juncture with the first leg.

3. The improved gas filter structure of claim 1 further comprising a slide track affixed to the duct at least on a pair of opposite sides of the holding frame;
   a pair of slides mounted within each of the slide tracks and having at least one locking flange abutting the locking flange of the holding frame on each of said slides;
   and semi-rigid locking channels embracing the aforesaid abutting locking flanges of the slide and the holding frame to seal said slide to said frame.

4. The improved gas filter structure of claim 1 further comprising
   a rigid perimeter seal disposed around said holding frame and having a sealing surface affixed to the duct and at least one locking flange offset from said sealing surface; and
   a semi-rigid locking channel resiliently embracing the locking flanges both of the perimeter seal and of the holding frame to seal said frame to the duct.

5. The improved filter structure of claim 4 wherein the perimeter seal and holding frame each have a pair of locking flanges one on each side of a seating ledge formed on the frame; and there are a pair of corresponding semi-rigid locking channels resiliently embracing corresponding ones of the locking flanges of the perimeter seal and holding frame.

6. The improved gas filter structure of claim 1 wherein the holding frames of adjacent filter units have a pair of locking flanges one on each side of the seating ledge;
   and there are a pair of semi-rigid locking channels embracing the aforesaid abutting locking flanges to secure adjacent holding frames together.

7. The filter structure of claim 6 wherein each holding frame has a pair of locking flanges and there is a locking channel embracing each pair of abutting locking flanges of adjacent holding frames to lock them together in two air-tight seals.

8. The filter structure of claim 6 wherein adjacent filter holding frames define between one another and their pair of abutting locking flanges, a cavity external to gas flow through the filter assembly for receiving stiffening members.

* * * * *